(12) United States Patent
Rieder

(10) Patent No.: US 11,543,337 B2
(45) Date of Patent: Jan. 3, 2023

(54) METHOD FOR SIGNALING A STANDARD FREQUENCY OF A DENSITY METER WHICH HAS AT LEAST ONE VIBRATABLE MEASUREMENT TUBE FOR CONDUCTING A MEDIUM

(71) Applicant: Endress+Hauser Flowtec AG, Reinach (CH)

(72) Inventor: Alfred Rieder, Landshut (DE)

(73) Assignee: Endress+Hauser Flowtec AG, Reinach (CH)

( * ) Notice: Subject to any disclaimer, the term of this patent is extended or adjusted under 35 U.S.C. 154(b) by 30 days.

(21) Appl. No.: 16/765,549

(22) PCT Filed: Oct. 30, 2018

(86) PCT No.: PCT/EP2018/079634
§ 371 (c)(1),
(2) Date: May 20, 2020

(87) PCT Pub. No.: WO2019/096576
PCT Pub. Date: May 23, 2019

(65) Prior Publication Data
US 2020/0309658 A1 Oct. 1, 2020

(30) Foreign Application Priority Data

Nov. 20, 2017 (DE) ..................... 10 2017 127 266.6

(51) Int. Cl.
*G01N 9/00* (2006.01)
*G01F 1/84* (2006.01)

(52) U.S. Cl.
CPC ........... *G01N 9/002* (2013.01); *G01F 1/8436* (2013.01); *G01F 1/8477* (2013.01); *G01N 2009/004* (2013.01); *G01N 2009/006* (2013.01)

(58) Field of Classification Search
CPC .... G01F 1/8468; G01F 1/8472; G01F 1/8481; G01F 1/849; G01F 1/8477; G01F 1/8486;
(Continued)

(56) References Cited

U.S. PATENT DOCUMENTS 4,262,523 A    4/1981 Stansfeld
5,295,084 A  * 3/1994 Arunachalam ....... G01F 1/8413
                                                         702/50
(Continued)

FOREIGN PATENT DOCUMENTS

CN    1233322 A   10/1999
CN    1934425 A    3/2007
(Continued)

*Primary Examiner* — John Fitzgerald
*Assistant Examiner* — Truong D Phan
(74) *Attorney, Agent, or Firm* — Christopher R. Powers; Endress+Hauser (USA) Holding, Inc.

(57) ABSTRACT

The method of the present disclosure for signaling a standard frequency of a density meter comprises: exciting bending vibrations of a measurement tube at an excitation mode working frequency, the working frequency depending on the density of a medium conducted in the measurement tube and on a disturbance variable; determining a characteristic value of the working frequency; determining a value representing the disturbance variable; calculating a corrected density value of the medium as a function of the characteristic value of the working frequency and of the value representing the disturbance variable; calculating a characteristic value of the standard frequency as a function of the corrected density value, the standard frequency being the frequency which produces the corrected density value in a calculation of the density using a frequency-dependent standard function which is not dependent on the disturbance variable; and providing a signal representing the standard frequency.

11 Claims, 3 Drawing Sheets

(58) Field of Classification Search
CPC ........ G01F 1/8495; G01F 1/86; G01F 1/8422;
G01F 1/8413; G01F 1/8409; G01F 1/80;
G01F 1/66; G01F 1/662; G01F 15/02;
G01N 9/00; G01N 9/002; G01N
2009/006; G01N 21/274
See application file for complete search history.

(56) References Cited

U.S. PATENT DOCUMENTS

| | | |
|---|---|---|
| 5,687,100 A | 11/1997 | Buttler et al. |
| 5,831,178 A | 11/1998 | Yoshimura et al. |
| 6,412,355 B1 * | 7/2002 | Haberli .................. G01F 1/849 |
| | | 73/861.357 |
| 2005/0034537 A1 | 2/2005 | Henry et al. |
| 2016/0356686 A1 | 12/2016 | Van Dijk et al. |

FOREIGN PATENT DOCUMENTS

| | | |
|---|---|---|
| CN | 101595372 A | 12/2009 |
| CN | 104105955 A | 10/2014 |
| DE | 19652002 A1 | 6/1997 |
| DE | 102004056235 A1 | 5/2006 |
| DE | 102013113689 A1 | 6/2015 |
| DE | 102014019396 A1 | 6/2016 |
| DE | 102015122661 A1 | 6/2017 |
| DE | 102016109251 A1 | 11/2017 |
| DE | 102016112600 A1 | 1/2018 |
| WO | 9421999 A1 | 9/1994 |

* cited by examiner

METHOD FOR SIGNALING A STANDARD FREQUENCY OF A DENSITY METER WHICH HAS AT LEAST ONE VIBRATABLE MEASUREMENT TUBE FOR CONDUCTING A MEDIUM

CROSS-REFERENCE TO RELATED APPLICATIONS

The present application is related to and claims the priority benefit of German Patent Application No. 10 2017 127 266.6, filed on Nov. 20, 2017, and International Patent Application No. PCT/EP2018/079634, filed on Oct. 30, 2018, the entire contents of which are incorporated herein by reference.

TECHNICAL FIELD

The present invention relates to a method for signaling a standard frequency of a density meter which has at least one vibrable measurement tube for conducting a medium. Density meters with vibrable measurement tubes are known per se and are described in a plurality of patents.

BACKGROUND

U.S. Pat. No. 4,262,523 A1 discloses a gas density meter. DE 10 2015 122 661 A1 discloses a method for determining the density of a liquid laden with gas. DE 10 2014 019 396 A1 discloses a method for measuring the density of a fluid with a compensation for influences of the position of the flow meter. The application DE 10 2016 112 600.4 describes a method for density measurement taking into account temperature effects. The application DE 10 2004 056 235 A1 describes a method for density measurement taking into account an increase in the volume of the measurement tube due to the media pressure.

On the other hand, there is an installed base of density computers, frequently called flow computers, which have a frequency signal input via which its excitation mode natural frequency of the measurement tube is received by a density meter in order to then calculate a density measurement value using coefficients which are stored during start-up and which correspond to the vibration behavior of the density meter under standard conditions. However, only with great effort, such density computers are often able to handle calculating a more accurate density measurement value taking into account further influencing factors according to algorithms which have since become available, in part because they lack the required signal inputs, in part because the possibilities for corresponding programming are not readily available. The installations using such a density computer thus lag behind the possibilities of modern measuring technology, and this is the case even if more modern density meters have been installed in the installation in the meantime. The object of the present invention is, therefore, to find a remedy.

SUMMARY

The object is achieved according to the invention by the method for calculating a standard frequency according to claim 1, the method for calculating a density according to independent claim 9 and the measuring sensor according to independent claim 10.

The method according to the invention for signaling a standard frequency of a density meter which has at least one vibrable measurement tube for conducting a medium comprises: exciting bending vibrations of the measurement tube in a bending vibration excitation mode at an excitation mode working frequency, the excitation mode working frequency depending on the density of a medium conducted in the measurement tube and on at least one disturbance variable; determining a characteristic value of the excitation mode working frequency; determining a value representing the disturbance variable; calculating a corrected density value of the medium as a function of the characteristic value of the excitation mode working frequency and of the value representing the at least one disturbance variable; calculating a characteristic value of the standard frequency as a function of the corrected density value, the standard frequency being the frequency which produces the corrected density value in a calculation of the density by means of a frequency-dependent standard function which is not dependent on the disturbance variable; and providing a signal which represents the standard frequency.

The characteristic value of a frequency f is either its value f or its period duration t=1/f.

In a development of the invention, the provided signal controls an oscillator that outputs as a function of the provided signal an oscillator signal which vibrates at the standard frequency.

In a development of the invention, the at least one disturbance variable influences an effective stiffness of the measurement tube with respect to the bending vibration excitation mode and/or the measurement tube volume.

In a development of the invention, the at least one disturbance variable comprises a pressure prevailing in the measurement tube and/or a temperature of the measurement tube.

In a development of the invention, the at least one disturbance variable is a viscosity, a flow velocity, a gas loading, a solids portion and/or a compressibility of the medium conducted in the measurement tube.

In a development of the invention, the at least one disturbance variable is an ambient temperature and/or a force and/or a bending moment acting on the measuring instrument from outside.

In a development of the invention, the excitation mode working frequency comprises an excitation mode natural frequency f1 or a frequency at which a phase angle with constant magnitude $|\varphi|$ is established between an excitation force and the deflection of the measurement tube, for which phase angle the following applies: $45°-\Delta\varphi \leq \varphi \leq 45°+\Delta\varphi$ frequency, where $\Delta\varphi \leq 10°$.

In a development of the invention, the standard function comprises a polynomial in $t=1/f$ and/or in $t^2=1/f^2$.

In the method according to the invention for calculating the density of a medium, which is conducted in a measurement tube of a density meter, by means of a processing unit which has a frequency input at which an oscillator signal is present which vibrates at the standard frequency, the processing unit calculates the density by means of the conventional function.

The measuring instrument according to the invention comprises an operation and evaluation circuit; and a vibration-type measuring sensor for determining the density of a medium having: at least one vibrable measurement tube for conducting the medium; at least one exciter for exciting bending vibrations of the measurement tube; and at least one vibration sensor for detecting the bending vibrations; wherein the operation and evaluation circuit is connected to the at least one exciter in order to drive the exciter with an excitation signal; the operation and evaluation circuit is connected to the at least one exciter and to the at least one vibration sensor of the measuring sensor; wherein the operation and evaluation circuit is configured according to the invention to execute the method according to the invention.

In a development of the invention, the measuring instrument has a signal output for providing an output signal which represents the standard frequency.

In a development of the invention, the output signal comprises an analog signal which vibrates at the standard frequency.

BRIEF DESCRIPTION OF THE DRAWINGS

The invention is explained in the following in further detail on the basis of the exemplary embodiments shown in the figures.

Shown are.

DETAILED DESCRIPTION

Figure 1:
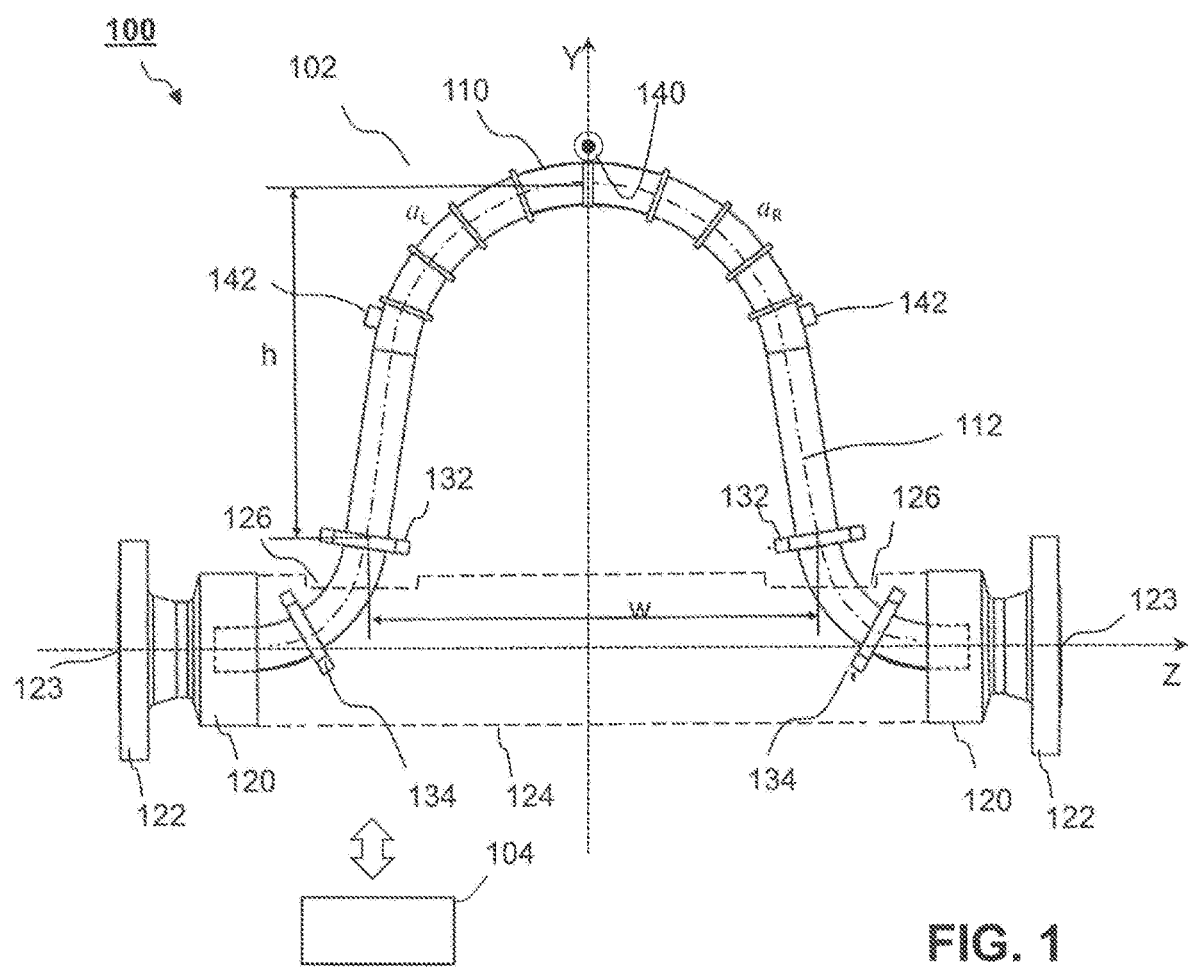
FIG. 1 shows a schematic representation of an exemplary embodiment of a measuring instrument according to the present disclosure.

The exemplary embodiment of a measuring instrument 100 according to the invention shown in FIG. 1 comprises a measuring sensor 102 and an operation and evaluation circuit 104. The measuring sensor 102 comprises a pair of curved measurement tubes 110. The measurement tubes 110 extend between an inlet-side collector 120 and an outlet-side collector 120, and are firmly connected to them, for example by rolling-in, welding or soldering. Extending between the collectors 120 is a solid support tube 124, which is firmly connected to both collectors, thereby rigidly coupling the collectors 120 to each other. On its upper side, the support tube 124 has openings 126 through which the measurement tubes 110 are guided from the collectors 120 out of the support tube 124 and back.

At each end, the collectors 120 have a flange 122, by means of which the Coriolis mass flow meter or density meter is to be installed in a pipeline. A mass flow is to be conducted by the measurement tubes 110 through central openings 123 in the flanges 122 in order to measure the mass flow or its density.

Figure 2:
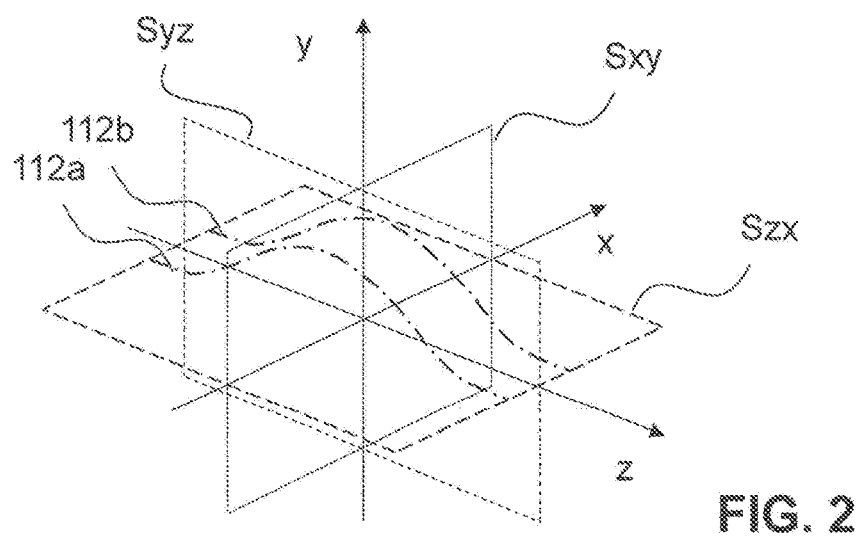
FIG. 2 shows a schematic representation of symmetries of the exemplary embodiment of a measuring instrument according to the present disclosure from FIG. 1.

FIG. 2 illustrates suitable symmetry properties for measuring sensors according to the invention. Measurement tube center axes $112a$, $112b$ of the two measurement tubes 110 which form the oscillator are shown for this purpose. The measurement tube center axes $112a$, $112b$ run symmetrically to a first reflection plane Syz, which runs between the measurement tubes. The measurement tube center axes furthermore run symmetrically to a second reflection plane Sxy, the so-called measurement tube transverse plane, which runs perpendicularly to the first reflection plane Syz. Vertices of the measurement tubes or of the measurement tube center axes lie within the measurement tube transverse plane. The measurement tube axes $112a$, $112b$ preferably run in planes which run in parallel to the first reflection plane. In relation to a third plane Szx, which runs perpendicularly to the first reflection plane and to the second reflection plane and in which the measurement tube axes $112a$, $112b$ run in the collectors, there is no symmetry of the measurement tubes. The intersection line between the first reflection plane Syz and the third plane defines a Z-axis of a coordinate system of the measuring sensor. The intersection line between the second reflection plane Sxy and the third plane Szx defines an X-axis of the coordinate system, and the intersection line between the first reflection plane Syz and the second reflection plane defines the Y-axis of the coordinate system. With the coordinates defined as such, we turn again to FIG. 1.

The measurement tubes 110 in pairs form an oscillator which specifically has a first bending vibration mode that is mirror-symmetrical to the measurement tube transverse plane and has a first natural frequency f1 and a second bending vibration mode that is mirror-symmetrical to the measurement tube transverse plane and has a second natural frequency f3, at which the measurement tubes vibrate in phase opposition in the X-direction. In order to excite the bending vibration modes of the measurement tubes in the X-direction, an electrodynamic exciter arrangement 140 is provided mirror-symmetrically to the measurement tube transverse plane and comprises, for example, a plunger coil on a first measurement tube and a plunger body on the opposite second measurement tube. The exciter arrangement is arranged in this case on the outside of the measurement tube bend, which is especially advantageous for exciting the second bending vibration mode, which is mirror-symmetrical to the measurement tube transverse plane, as explained in the still unpublished patent application DE 10 2016 109 251.7. In principle, however, the exciter arrangement 140 can also be arranged on the inside of the measurement tube bend.

For detecting the vibrations of the measurement tubes, sensor arrangements 142 are provided symmetrically to the measurement tube transverse plane Sxy and are respectively configured as an inductive arrangement having a plunger coil on a tube and a plunger body on the other tube. Details are known to the person skilled in the art and need not be explained here.

In order to influence the vibration properties, the measurement tubes 110 are each connected to couplers 132, 134 on the inlet side and outlet side, wherein a free vibration length of an oscillator formed by the two measurement tubes 110 is fixed by the position of the two inner couplers 132, that is, those which are each furthest away from the corresponding collector 120 on the inlet side or outlet side. This free vibration length influences the oscillator's bending vibration modes, especially their natural frequencies, with which the oscillator preferably is to be excited. Outer couplers 134, each arranged between the inner node plates 132 and the collectors 120, serve especially to define further vibration nodes.

Figure 3:
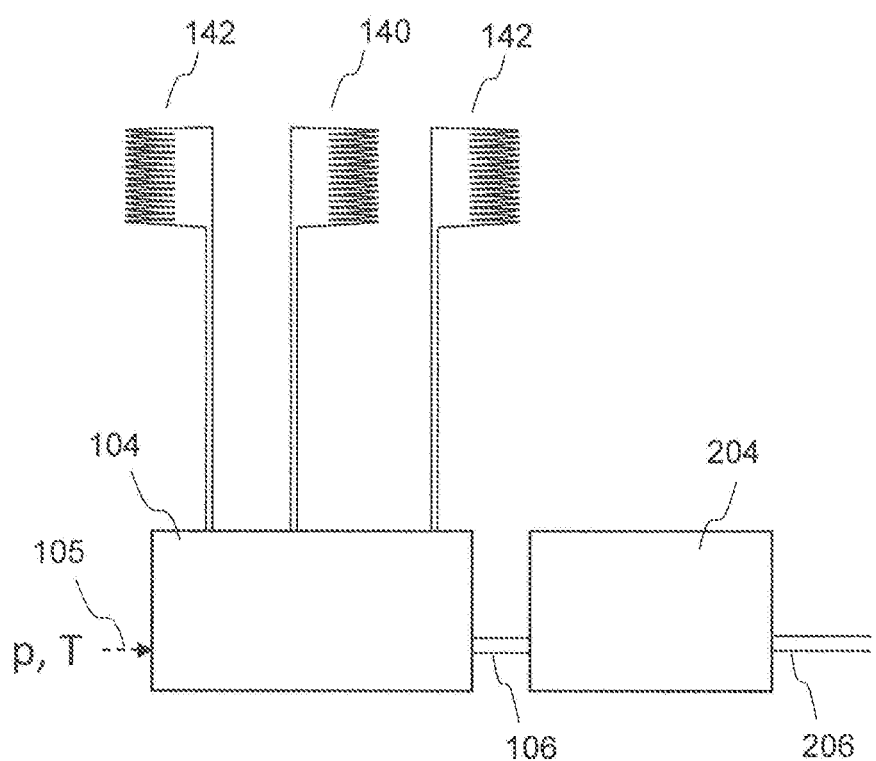
FIG. 3 shows a schematic representation of the circuitry of exciter arrangement and sensor arrangements of the exemplary embodiment of a measuring instrument according to the present disclosure from FIG. 1.

As schematically illustrated in FIG. 3, the coil of the exciter arrangement 140 and the coils of the sensor arrangements 142 are connected to the operation and evaluation circuit 104. The operation and evaluation circuit 104 is configured to supply the exciter arrangement with an excitation signal having a working frequency that depends on the density of a medium located in the measurement tubes. The operation and evaluation circuit is furthermore configured to receive and evaluate sensor signals of the sensor arrangements. If the working frequency is to be an excitation mode natural frequency of a bending vibration excitation mode, the operation and evaluation circuit is configured to vary the working frequency in order to find a maximum ratio of sensor signals. The associated working frequency then forms the basis for the density calculation. In another embodiment, the operation and evaluation circuit 104 is configured to vary the working frequency in order to find a defined phase angle between the sensor signals and the excitation signal, for example a phase angle of approximately 45°, wherein the associated working frequency again forms a basis for the density calculation. In addition, the operation and evaluation circuit 104 can have signal inputs 105 for the input of disturbance variable values, such as pressure and/or temperature.

Figure 4:
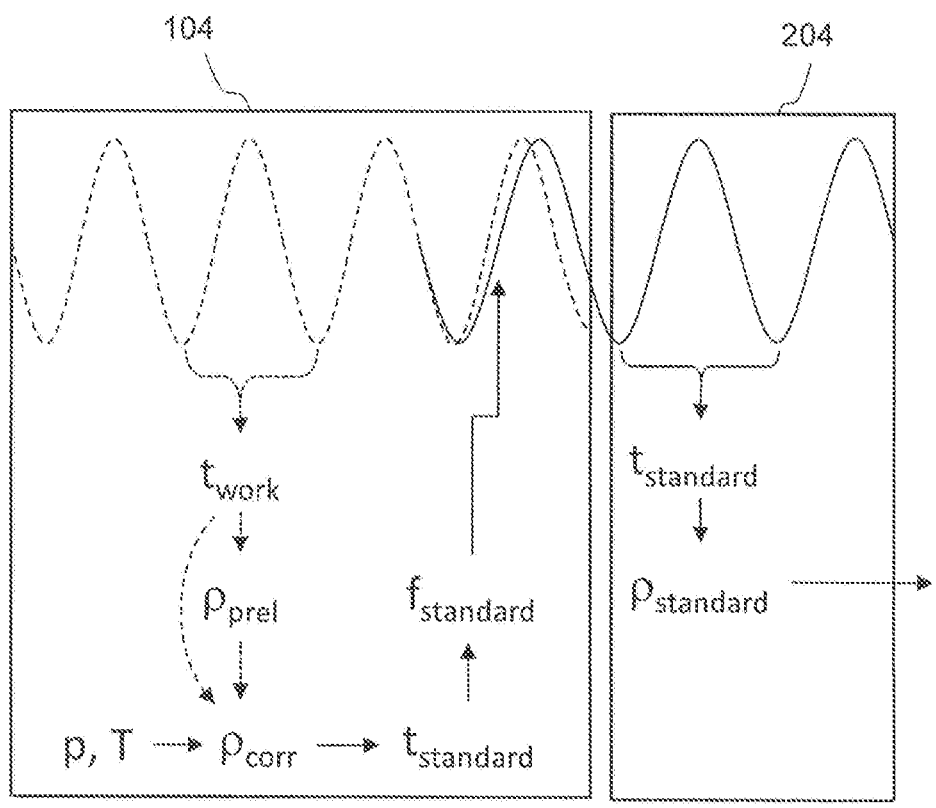
FIG. 4 shows a schematic diagram for executing the method according to the present disclosure.

As illustrated in the schematic diagram in FIG. 4 on the basis of an example for operating the operation and evaluation circuit 104, a period duration $t_{work}$ of the working frequency is first determined on the basis of the excitation signal (shown by dashed lines). With the aid of current values of disturbance variables, such as p and T, a corrected density value $\rho_{corr}$ is calculated from the period duration $t_{work}$ either directly or via a preliminary density value $\rho_{prel}$, which does not yet take into account the disturbance variables. A standard period duration is then calculated on the basis of the corrected density $\rho_{corr}$ and in turn produces the corrected density $\rho_{corr}$ when the density is calculated with a standard function which depends on the period duration and is independent of the disturbance variables. A signal generator of the operation and evaluation circuit 104 is controlled in order to generate a frequency signal having the frequency $f_{standard}$ and corresponding to the standard period duration $t_{standard}$ and to provide it at the frequency output 106 shown in FIG. 3. This frequency signal (shown by a solid line) is present at the signal input of a density computer 204 in which the standard function is implemented. In the density computer, the period duration of the frequency signal, which should correspond to the standard period duration $t_{standard}$, is determined. A density calculation based on the standard period duration with the standard function results in a standard density $\rho_{standard}$, the value of which matches the value of the corrected density $\rho_{corr}$ and can be output at an interface 206.

As a result, a density computer which itself is obsolete can in this way still provide density values which satisfy the latest findings regarding measured value determination without any need to intervene in the density computer.

How the corrected density value $\rho_{corr}$ is calculated as a function of the working frequency and the disturbance variables is not the subject matter of the present invention; various approaches from the prior art in this respect are known to the person skilled in the art, for example those from U.S. Pat. No. 4,262,523 A1 DE 10 2015 122 661 A1 DE 10 2014 019 396 A1 DE 10 2016 112 600.4 and DE 10 2004 056 235 A1. According to the invention, only one standard frequency which corresponds to the corrected density value $\rho_{corr}$ and which in most cases would deviate from the working frequency is to be determined and signaled in order for a calculation with a frequency-dependent standard function to produce the corrected density value $\rho_{corr}$.

The standard function with which a standard density value $\rho_{standard}$ is to be determined independently of any disturbance variables can, for example, have the following form:

$$\rho_{standard} = k_0 + k_1 \cdot t_{standard},$$

where the standard period duration $t_{standard}$ is the reciprocal of the standard frequency $f_{standard}$ to be determined and signaled.

If the standard density value $\rho_{standard}$ is to correspond to the corrected density value $\rho_{corr}$, the standard frequency is thus given as:

$$f_{standard} = \frac{k_1}{\rho_{corr} - k_0},$$

The operation and evaluation circuit has a signal generator which is activated in order to provide a vibration signal with the standard frequency $f_{standard}$ at the frequency output 106.

An alternative standard function with which a standard density value $\rho_{standard}$ is to be determined independently of any disturbance variable has, for example, the following form:

$$\rho_{standard} = k_0 + k_2 \cdot t_{standard}^2,$$

where the standard period duration $t_{standard}$ is the reciprocal of the standard frequency $f_{standard}$ to be determined and signaled.

Since here too the standard density value $\rho_{standard}$ is to correspond to the corrected density value $\rho_{corr}$, the standard frequency is in this case given as:

$$f_{standard} = \sqrt{\frac{k_2}{\rho_{corr} - k_0}}.$$

Figure 5:
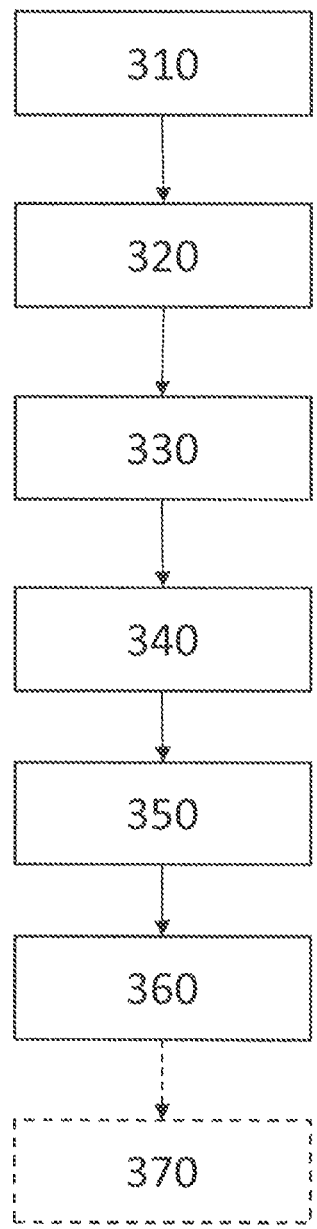
FIG. 5 shows a flow diagram for executing the method according to the present disclosure.

FIG. 5 shows once again a sequence of method steps in accordance with an exemplary embodiment of a method 300 according to the invention.

In a first step 310, bending vibrations of the measurement tube are excited in a bending vibration excitation mode at an excitation mode working frequency, wherein the excitation mode working frequency is, for example, the excitation mode natural frequency found by maximizing the ratio between amplitudes of sensor signals and excitation power.

In a second step 320, a period duration of the excitation mode working frequency is then determined as its characteristic quantity.

In the next step 330, a value representing a disturbance variable is determined. This may comprise, for example, the reception of a pressure measurement value, via which a pressure-dependent stiffening of the measurement tube can be calculated.

Taking into account the effect of the disturbance variable, a corrected density value $\rho_{corr}$ of the medium in the measurement tube is calculated in the next step 340 as a function of the value of the excitation mode working frequency and of the value representing the at least one disturbance variable.

Starting from the corrected density value $\rho_{corr}$, a value of the standard frequency is calculated 350, the standard frequency being the frequency which produces the corrected density value $\rho_{corr}$ in a calculation of a standard density $\rho_{standard}$ by means of a frequency-dependent standard function which is not dependent on the disturbance variable.

Lastly, this is followed by signaling 360 of the determined standard frequency, which is signaled, for example, by an oscillator signal which vibrates at the standard frequency and is provided at a frequency output.

The oscillator signal may be received by a density computer and used for calculating 370 a corrected density value $\rho_{corr}$ by means of a standard function.

The invention claimed is:

1. A method for calculating a density of a medium conducted in a measurement tube of a density meter, the method comprising:
    exciting bending vibrations in a measurement tube of the density meter in a bending vibration excitation mode at an excitation mode working frequency, wherein the excitation mode working frequency depends on the density of a medium conducted through the measurement tube and on at least one disturbance variable;
    determining a characteristic value of the excitation mode working frequency;
    determining a value representing the at least one disturbance variable;
    calculating a corrected density value of the medium as a function of the characteristic value of the excitation mode working frequency and of the value representing the at least one disturbance variable;
    calculating a characteristic value of a standard frequency as a function of the corrected density value, the standard frequency being the frequency which produces the corrected density value in a calculation of the density using a frequency-dependent standard function which is not dependent on the disturbance variable;
    providing a signal which represents the standard frequency;
    controlling an oscillator to generate and output an analog oscillator signal as a function of the provided signal, wherein the oscillator signal oscillates at the standard frequency; and
    calculating the density of the medium with a density computer using the oscillator signal, wherein the density computer includes a signal input via which the oscillator signal is received, and wherein the density computer calculates the density using the standard function, which includes stored coefficients that correspond to vibration behavior of the density meter under standard conditions.

2. The method of claim 1, wherein the at least one disturbance variable is a viscosity, a flow velocity, a gas loading and/or a compressibility of the medium conducted in the measurement tube.

3. The method of claim 1, wherein the at least one disturbance variable is an ambient temperature and/or a force and/or a bending moment acting on the density meter from outside.

4. The method of claim 1, wherein the excitation mode working frequency comprises an excitation mode natural frequency or a frequency at which a phase angle having a constant magnitude is established between an excitation force and a deflection of the measurement tube, for which phase angle the following applies:

$$45°-\Delta\varphi \leq \varphi \leq 45°+\Delta\varphi,$$

where $\varphi$ is the phase angle and $\Delta\varphi \leq 10°$.

5. The method of claim 1, wherein the standard function comprises a polynomial in $t=1/f$ or in $t=1/f^2$, wherein f is a frequency and t is an associated period duration.

6. The method of claim 1, wherein the density computer is a flow computer.

7. The method of claim 1, wherein the at least one disturbance variable influences an effective stiffness of the measurement tube with respect to the bending vibration excitation mode and/or a volume of measurement tube.

8. The method of claim 7, wherein the at least one disturbance variable comprises a pressure prevailing in the measurement tube and/or a temperature of the measurement tube.

9. A measuring instrument, comprising:
    an operation and evaluation circuit;
    an oscillator configured to generate and output an analog oscillator signal;
    a density computer; and
    a vibration-type measuring sensor configured to determine a density of a medium, the measuring sensor comprising:
        at least one measurement tube adapted to conduct the medium;
        at least one exciter configured to excite bending vibrations of the measurement tube; and
        at least one vibration sensor configured to detect the bending vibrations,
    wherein the operation and evaluation circuit is:
        connected to the at least one exciter as to drive the exciter with an excitation signal;
        connected to the at least one exciter and to the at least one vibration sensor of the measuring sensor;
        connected to the oscillator; and
        configured to perform the method of claim 1.

10. The measuring instrument of claim 9, wherein the operation and evaluation circuit comprises a signal output configured to provide the signal that represents the standard frequency.

11. The measuring instrument of claim 10, wherein the output signal comprises an analog signal that oscillates at the standard frequency.

* * * * *